Nov. 1, 1938.　　　A. N. GOLDSMITH　　　2,134,757
CONTROL SYSTEM
Filed Dec. 12, 1935　　　3 Sheets-Sheet 1

INVENTOR.
A. N. GOLDSMITH
BY
ATTORNEY.

Nov. 1, 1938.                A. N. GOLDSMITH                2,134,757
                              CONTROL SYSTEM
                          Filed Dec. 12, 1935            3 Sheets-Sheet 2

INVENTOR.
A. N. GOLDSMITH
BY
ATTORNEY.

Nov. 1, 1938.  A. N. GOLDSMITH  2,134,757
CONTROL SYSTEM
Filed Dec. 12, 1935  3 Sheets-Sheet 3

INVENTOR.
A. N. GOLDSMITH
BY
ATTORNEY.

Patented Nov. 1, 1938

2,134,757

UNITED STATES PATENT OFFICE 2,134,757

CONTROL SYSTEM

Alfred N. Goldsmith, New York, N. Y.

Application December 12, 1935, Serial No. 54,023

11 Claims. (Cl. 178—7.1)

This invention relates to automatic control apparatus and in particular to closed-cycle servo-mechanism control systems.

A servo-mechanism may be defined as a power amplifying device in which the amplifier element driving the output is actuated by the difference between quantities proportional respectively to the input to the servo and its output. A closed-cycle control is one in which the control is actuated by a quantity that is affected by the control operation. Thus, my invention is related to automatic control systems defined by the above definitions. In the past, closed-cycle servo-mechanisms have been actuated by the difference between a predetermined value of a quantity and a variable quantity which is affected by the control operation. I have discovered that the utility of a closed-cycle servo-mechanism can be enormously enhanced by using a maximum ratio of a dependent quantity to an independent quantity to affect the control mechanism. Or alternatively, use may be made of the maximum ratio of an independent quantity to a dependent quantity. What is here meant by "dependent quantity" is a quantity which is affected by the control operation while the independent quantity is one which is relatively uninfluenced by the control operation. The use of the maximum ratio of a dependent to independent quantity for actuating control mechanisms is valuable because elaborate precautions do not have to be taken to maintain absolute constancy of the independent quantity. My invention only requires that the ratio of the two quantities be always a maximum. Consequently, any change in the absolute magnitude of the independent quantity can not cause a change in the control as long as the dependent quantity is fixed.

It will be understood in this connection that these same remarks apply as well where my system of control utilizes the maximum ratio of the independent to dependent quantities.

The full significance of this important method of operating servo-mechanisms will be more fully appreciated in considering the description of my invention below.

Such a control system readily lends itself to wide fields of application in which are included automatic focusing, radio receiver tuning, radio receiver volume controls, radio receiver frequency controls, acoustical control of torpedos, and automatic steering and stability control of land, sea and air craft. It is accordingly my main object to provide an improved closed-cycle control system.

It is also one of my objects to provide a closed-cycle control system which is actuated by a function of the maximum ratio of a dependent to independent quantity, or alternatively to provide a closed-cycle control system which is actuated by a function of the maximum ratio of an independent to a dependent quantity.

Still another object of my invention is to provide ways and means for automatically determining the ratio of two alternating electric currents of the same or different frequencies.

A further object of my invention is to provide an automatic focusing means for a television system.

Another object of my invention is to provide an automatic radio receiver tuning control.

A still further object of my invention is to provide a homing torpedo control system.

Another object of my invention is to provide a photographic exposure meter which will automatically give the density range of a positive or negative.

Again, a further object of my invention is to provide an automatic homing device for automotive land, sea, or air craft.

Further objects will become evident upon reading my description and taking it in conjunction with the drawings of which;

Figure 1:
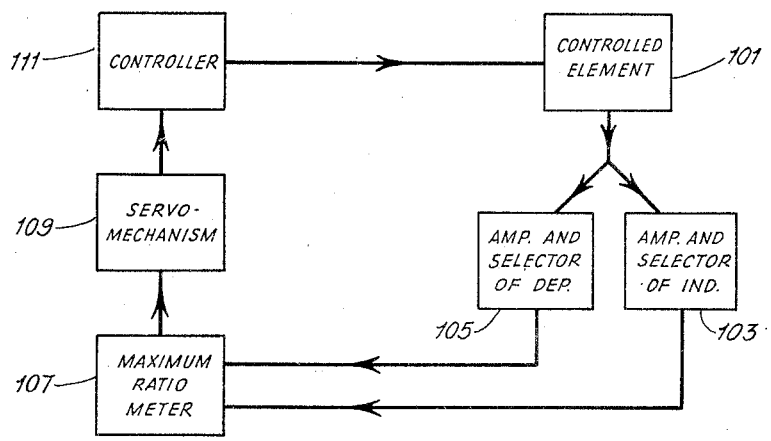
Fig. 1 is a block diagram illustrative of one form of my invention.

Turning now to Fig. 1 where a blocked diagram illustrative of my invention is shown, the operation of my improved closed-cycle control system may be described briefly as follows:

The device or apparatus 101 which is to be controlled has a single output of a complex nature from which may be derived by a suitable means two quantities, one of which is markedly dependent upon the control operation, and one of which is relatively independent of the control operation. These selector devices 103 and 105 in turn feed a ratio meter 107 after the selector 103 has selected the quantity independent of the control operation and the selector 105 has selected the dependent quantity. What I have chosen to call a "maximum ratio meter" is an apparatus (to be described more fully below) which is dependent for its reading or setting upon the ratio of the two selected quantities derived from the selectors 103 and 105 and gives an indication which is proportional to this ratio. The indication of the ratio meter 107 serves to suitably control the servo-mechanism 109 whenever there is an appreciable deviation from a relative (not absolute) maximum of the ratio thereon indicated, which in turn actuates the controller 111 in such a fashion as to make the ratio of the two derived quantities from the controlled device 101 a maximum. When the maximum ratio of these two derived quantities is obtained, the system exerts such control as to maintain the particular setting of the control device. Any condition arising which may disturb this maximum ratio will immediately bring into play the maximum ratio meter 107 which in turn affects the controller 111 through the servo-mechanism 109 to readjust the conditions of the control device 101 to again produce maximum ratio of the two derived quantities.

This particular modification of my system is applicable to a control system where a single control device produces two quantities in a single output and these quantities are qualitatively alike but quantitatively different. For example, the control device might produce alternating currents of two or more different frequencies, one frequency of which is relatively uninfluenced by the adjustments produced by the controller 111 while the other one is dependent upon these adjustments. In this case the selectors 103 and 105 might be a suitable amplifier associated with a suitable filter in order to select the two desired frequencies. That is, the selector 103 would pass the frequency which was independent of the control action while selector 105 would pass a frequency which was dependent upon the control action. Thus, these two quantities are alike qualitatively, inasmuch as they are alternating currents, but differ quantitatively since their frequencies are different.

Figure 2:
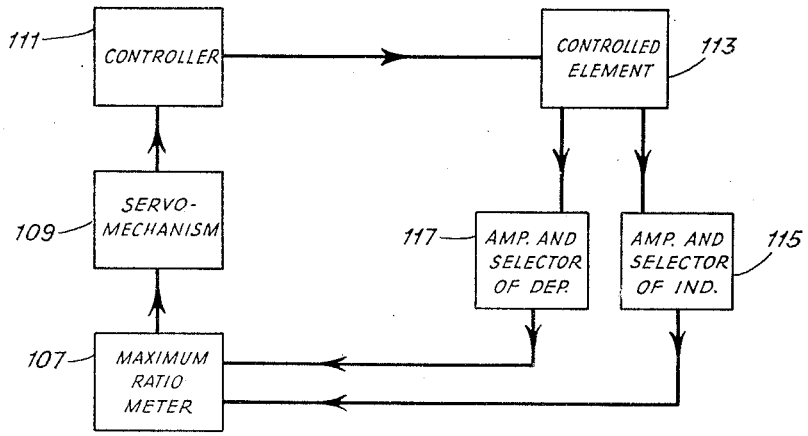
Fig. 2 is a block diagram illustrative of a modification of my invention.

Fig. 2 illustrates in simple block diagram fashion my invention where the control action is developed by two different quantities from the control device 113, one of which quantities is dependent upon the control and the other is independent of the control. In this figure identical portions of the complete control system carry the same designating numerals as those in Fig. 1. Such a system might be used, for example, in communications, where a variable phase correcting network is used on long telephone lines. It is well known that on such lines varying weather conditions produce changes in the phase of the received signals. It is also well known that where it is desired to transmit pictures, for example, that varying phase angles of the received picture currents produce distortions in the recorded picture. To overcome this phase correcting networks are utilized so that if a change in phase is produced anywhere along the line a complementary change in phase angle is effected by the correcting network to nullify the first mentioned phase change.

In the past the correcting network was manually controlled. My invention, however, may be used automatically to control such a correcting network, by transmitting a pilot signal, that is, a steady current of constant frequency. In this case, the dependent quantity would be the phase angle of the arriving pilot signal and the independent quantity would be the frequency of the signal, which, of course, is unchanged. The selector 115 would pass the frequency through to the ratio meter while the selector 117 which may be a phase detector, would develop a signal which is proportional to the phase angle of the received signal. The maximum ratio meter 107 would actuate the controller 111 through the servo-mechanism 109, which, in turn, would vary the phase correcting network so as to produce a maximum ratio between the quantity related to the frequency and the quantity related to the phase of the angle. In this fashion the correcting network may automatically be adjusted to produce the correct phase relations for all of the other incoming signals. While the phase correcting network and the phase detection bridge are not shown, they are well known in the art and appear in the publications of the Bell System Technical Journal, the Proceedings of the Institute of Radio Engineers, and other books and journals relating to the communications field.

Figure 3:
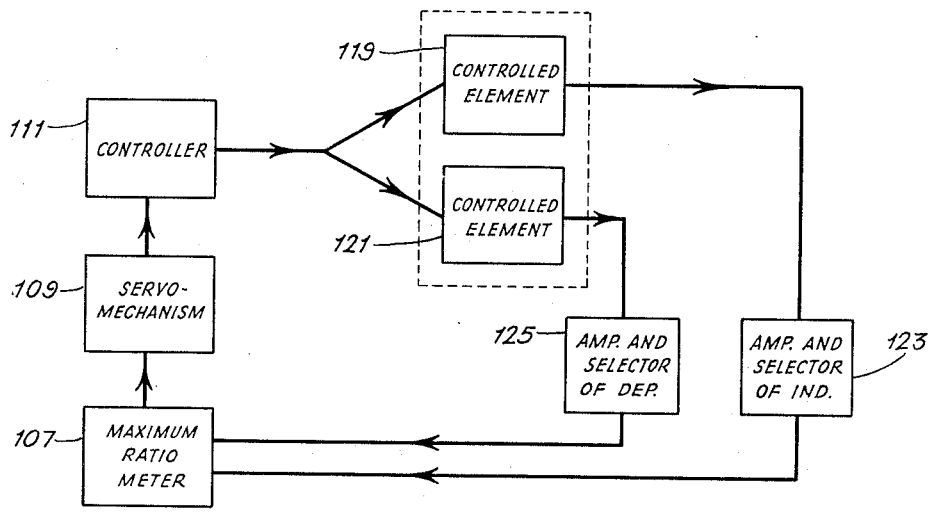
Fig. 3 is a block diagram illustrative of another modification of my invention.

A further modification of my invention is shown in block diagram in Fig. 3 in which as before similar elements such as the maximum ratio meter 107, the servo-mechanism 109, and the controller 111 carry the same identifying numerals as in the previous figures. In this embodiment the controller simultaneously affects two similar controlled devices 119 and 121. From these devices a quantity dependent and a quantity independent of the control respectively are derived. Suitable selectors 123 and 125 are provided to feed the ratio meter 107.

This system finds great utility in the field of automatic homing devices for automotive aircraft for use on land, sea or air. For example, the control devices 119 and 121 may each be a microphone, one of which is mounted in the bow of the hull of a ship, while the second is mounted in the stern of the hull. A submarine oscillator is provided, for example, amidships in the hull. By sending a continuous frequency out from the submarine oscillator, a portion of the emitted energy will be returned to the hull by reflection from the bed of the ocean, river or lake. Due to the attenuation of the energy level as it travels through the water, a sloping bottom or bed will return different signal energies to the fore and aft microphones, unless the ship is running parallel to the slope of the bed. If now, the output of each of the microphones are fed through the selectors 123 and 125 which may each comprise an amplifier and a band-pass filter, and the outputs of these selectors fed to the ratio meter, the ratio meter 107 will actuate the controller 111 through the servo-mechanism 109 in such a fashion as to steer the ship so that the ratio of the signal picked up from the stern microphone to that picked up by the bow microphone, will be a maximum. In this condition, the ship is heading away from shoal water so that in times of fog or under conditions where it is difficult to obtain bearings, the ship will be prevented from running aground. It will be noted in this particular instance that although the absolute magnitude of both the bow and stern energies are changing, nevertheless, it is the output of the stern which is relatively independent of the ship's position. In this case, it will be noted, likewise, that use is made of the maximum ratio of the independent to the dependent control in contra-distinction to the other modifications of my invention where use is made of the maximum ratio of the dependent to the independent control.

While I have not shown microphones and submarine oscillators, it is understood, of course, that any of these types of apparatus well known in the art, may be used.

Figure 4:
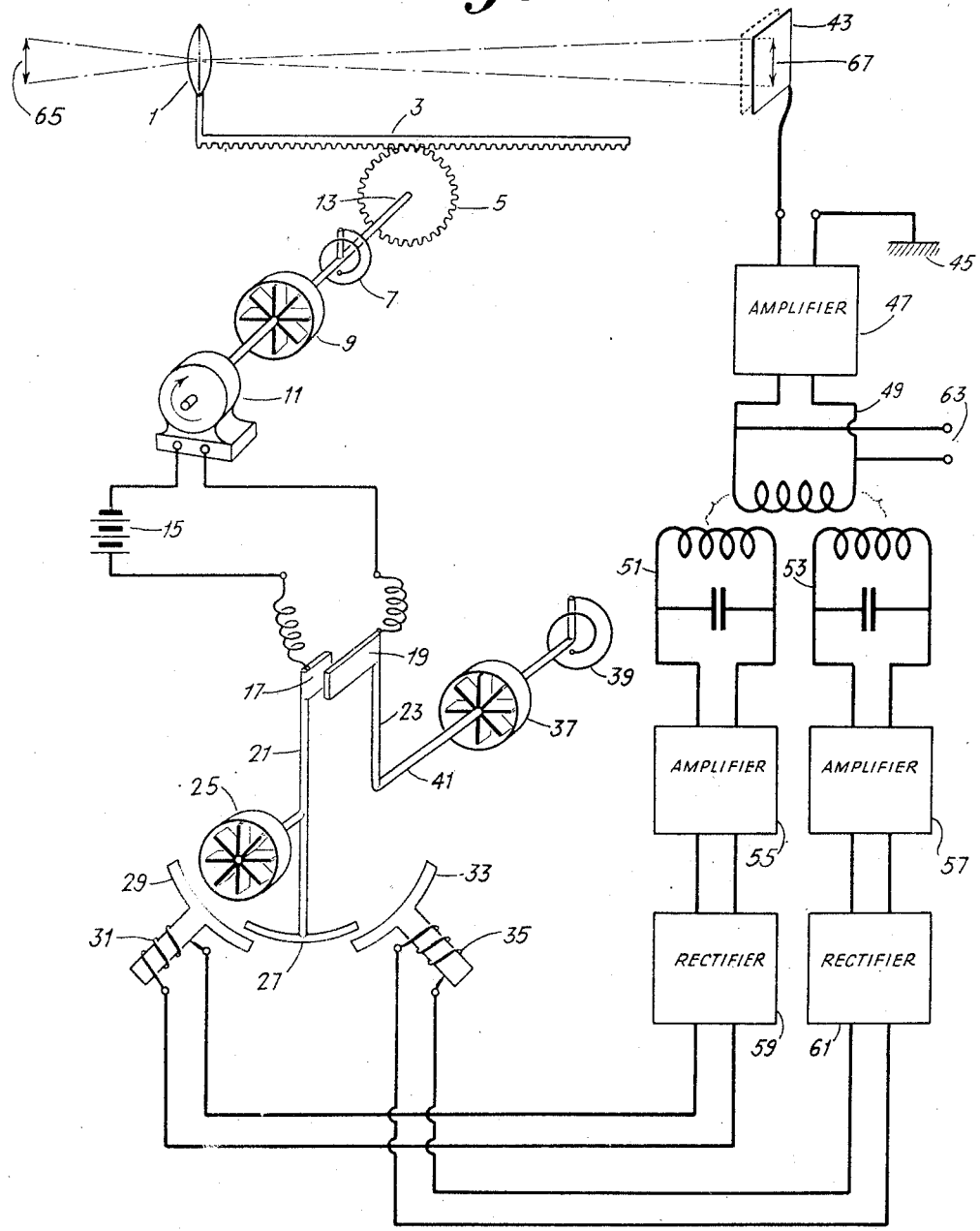
Fig. 4 is one embodiment of my invention applied to a television scanning system.

Turning now to Fig. 4, for purposes of illustrating and describing my invention more fully and particularly for showing more specific embodiments of the ratio meter 107, the servomechanism 109, and the controller 111, I have chosen for an example the application of my control system to an automatic focusing arrangement for use in television. It will be readily seen upon reading the description of the example when taken in conjunction with the drawings that the same general principle of my invention in this embodiment can be readily applied to a homing torpedo, automatic volume, fidelity and frequency control of radio receivers and transmitters. By choosing an automatic focusing arrangement for a television system, I in no way limit the application of my invention in closed-cycle control systems; I merely choose this for convenience and because it illustrates the application of my invention to a very promising field. As is well known, the sharpness and detail of received television images are dependent in part upon the sharpness of focus which can be obtained at the transmitting scanning apparatus of the television system. In the past, manually controlled focusing arrangements for focusing the image to be transmitted by television upon the scanning system have been used. These manually controlled systems have consisted generally of a lens mounted suitably on a rack and adapted to be actuated by a pinion. On the actuating mechanism a calibrated scale of distances is provided to indicate at what distances the produced image on the scanning system is accurately in focus. This calls for judgment on the part of the operator as to what distance the object from the transmitting scanning device is situated. Consequently, using such a method the failibility of judgment and limitations in manual skill of the operator prevent at times the sharpest focus from being utilized.

It has also been proposed to utilize auxiliary lens identical with the pick-up lens, and ground glass plate for manually focusing the object by mounting the ground glass plate in the same plane as the scanning device, and mounting the auxiliary lens integral with the lens used for actually picking up the object to be scanned. In this fashion, the control means moves both lenses simultaneously and by observing the image on the ground glass plate, the point of focus can be quite accurately determined. However, this method of focusing has the drawback of first producing an inverted image on the ground glass plate and hence rendering the point of focus difficult to determine, and secondly, renders the operation relatively slow since the operator in order not to over-shoot the point of focus must make the adjustment relatively slowly. A further drawback is that in scenes where moving objects are to be picked up for scanning, it is difficult for the operator both to train the pick-up device on the object and at the same time to observe the ground glass plate for focusing purposes.

My new and novel methods of producing automatic focusing are founded upon the principle that in a television system, for example, where an object is scanned point for point, the conversion of the scanned elemental areas into electrical signal impulses through the medium of photosensitive devices, produces trains of signals which are quasi-periodical. These trains of signals can be resolved into a series of sinusoidal electrical currents which bear definite frequency, amplitude and phase relations to each other, depending upon the train of signal impulses.

Where television pictures are being scanned, the lower frequencies of such a resolution are determined by the light scanning speed, as well as the framing speed, while the higher frequency components will be determined by the image in the field being scanned. The magnitude of these higher frequency components depends upon the sharpness of resolution of the picture, which is another way of saying that the amplitude depends in part, all other things being equal, upon the sharpness of focus of the image upon the scanning means.

I make use of this effect in the following fashion. The output of the video frequency amplifier is fed simultaneously to two band-pass filters, one of which will pass the lower video frequency, while the other passes the higher video frequencies. The frequencies in both of the band-passes are amplified and rectified by separate amplifiers and rectifiers, and the rectified currents are utilized to determine automatically the ratio of the higher video frequencies to the lower video frequencies. It will be appreciated that the lower video frequencies being dependent upon the scanning and framing rates, will be relatively little influenced by the sharpness of focus of the image, upon the scanning device. On the other hand, the magnitude of the higher video frequency will be directly dependent upon the sharpness of focus. Consequently, when the image is accurately in focus upon the scanning means, a maximum ratio of the higher video frequency to the lower video frequencies will be obtained. I, therefore, provide means for moving the lens system which focuses the object upon the scanning means in accordance with the ratio of the higher video frequency currents to the lower video frequency currents, until the lens takes the position to give the maximum ratio of these two currents. At this point the image is sharply in focus upon the scanning means. Any change in the position of the object will, in general, give a different ratio of these two currents, but this is automatically compensated for by the fact that the focusing means comes to rest whenever the maximum ratio of the two currents is reached regardless of what this maximum value may be. The same thing, of course, applies to changes of objects within the field since this also would change the value of the maximum ratio.

Thus, my invention provides means for automatically maintaining sharpness of focus of an image under changing distances, changing objects, or the combination of both.

Figure 5A:
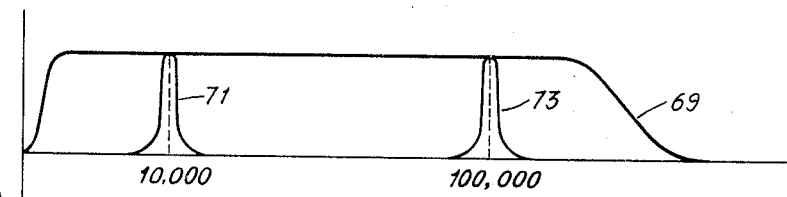
Figs. 5a, 5b, and 5c are frequency-response characteristics of certain electrical circuits which may be used in the various embodiments of my invention.

In describing my invention, I will assume that a suitable television transmitting scanning system is provided, such as shown in the Zworykin British Patent No. 369,832, in which a photosensitized screen is adapted to have the image which is to be televised focused upon it. Referring now to Fig. 1, the arrow 65 represents the object which is to be televised. The lens 1 throws an image 67 of the object 65 upon the photosensitive screen 43. The scanning system (not shown) is assumed to be in operation and the developed signal is conventionally represented as going to the amplifier 47 and through the ground connection 45. A pair of leads 63 go to the television transmitter proper from the output 49 of the amplifier 47. The output 49 is further coupled to the tuned circuits 51 and 53. Of these circuits, circuit 51 is tuned to pass the higher frequency, while circuit 53 is tuned to pass the lower video frequencies. For example, assuming that all frequencies from 10 cycles up to 500,000 cycles are produced in the output of the video frequency amplifier 47, as shown by curve 69 in Fig. 5a, circuit 53 would pass the frequencies of 10,000 plus or minus 1,000 cycles, as shown by curve 71, while circuit 51 would pass frequencies of 100,000 plus or minus 10,000 cycles, as shown by curve 73. The values of the central frequency and of the frequency band width of each of these amplifiers, as given above, is purely illustrative and subject to modification in accordance with experience gained in the scanning of pictures used in actual broadcasting.

Figure 5B:
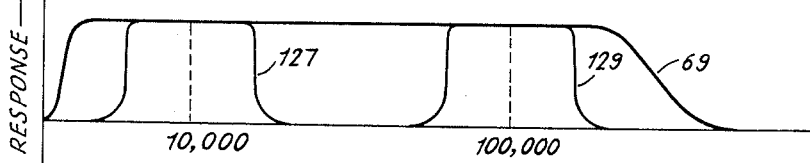
Figure 5C:
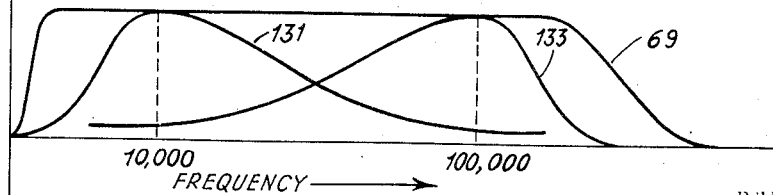

For example, it may be desirable to use symmetrical band-pass filters of wider frequency band as shown in Fig. 5b where the curves 127 and 129 respectively, show a low frequency wide-band band-pass filter and a high frequency wide-band band-pass filter. Or alternatively, unsymmetrical filters with characteristics shown as 131 and 133 in Fig. 5c may be used since for in scanning objects in television, the resultant frequencies produced are not necessarily fixed. By the use of unsymmetrical filters the variation of generated frequency does not inhibit the proper functioning of the maximum ratio method of control.

These frequencies are suitably amplified by amplifiers 55 and 57, which may be any of the amplifiers well known in the art, and equipped with variable attenuators to control the amplitude of the output of said amplifiers. The output of the amplifiers 55 and 57 feed to the rectifiers 59 and 61 respectively. These rectifiers may be of any suitable type, either thermionic or of the dry rectifier type. The output of the rectifiers go to the electromagnetic windings 31 and 35, which are mounted upon soft iron magnetic cores 29, and 33 respectively, equipped with suitable shaped pole faces as will be hereunder described.

Positioned between the pole pieces and free to rotate about a pivot point, is a soft iron armature 27 in the form of an arc fastened on an arm 21. On the arm 21 is also mounted a shaft upon which is fixed a paddle member immersed in a liquid held in a suitable container to act as a dash-pot. At the opposite end of the arm 21, apposite to the soft iron armature 27, a suitable contact member 17 is fixed. Adjacent to and in register with it is a similar contact 19 mounted on an arm 23 which is fixed to a shaft 41 upon which is also mounted a paddle-like member immersed in a liquid and held in a suitable container to form the dash-pot 37, and a spring drive 39. A servo-motor 11 has connected in series a source of power 15 represented conventionally by a battery, and flexible connections to the two contacts 17 and 19.

Mounted on the motor shaft 13 is a dash-pot 9, a spring drive 7, and a pinion 5. Engaged with the pinion is a rack upon which is mounted the lens 1.

Having described the component parts of my automatic focusing system, I will now describe the sequence of operation.

Suppose that the lens is to the left of the position for giving sharp focus on the photo-sensitive screen 43. In this position the ratio of the higher video frequency currents to the lower video frequency currents is low. Consequently, the rectified current flowing through the energized coil 35 will produce a stronger magnetic field over the pole face 33, than the current flowing in the winding 31 will produce over the pole face 29. These pole faces may be shaped in the form of arcs, being concentric with, but of larger radius than the arc member 27. Under the influence of these magnetic fields, and since the field at the pole face 33 is stronger, the arc member 27, which I have designated as the ratio arm will move toward the right, attempting to line up with the pole face 33. The spring drive 39 causes the shaft 41 to rotate counter-clockwise until the contact 19 touches contact 17. The contacts 17 and 19 constitute a switch which now being closed, actuates the motor which is so connected to rotate clockwise. The rotation of the motor 11 through the pinion 5 and rack 3 causes the lens to move to the right. As the lens moves to the right, it approaches closer and closer the proper point to sharply focus the image on the photo-sensitive screen 43, thereby increasing the amplitude of the higher frequency video currents. This increase in the higher frequency video currents in turn produces a stronger magnetic field at the pole face 29, which tends to move the ratio arm back toward the left, which in turn keeps the switch comprising contacts 17 and 19, closed. The motor continuing to rotate, drives the lens finally to the position of maximum sharpness of focus.

At this point the ratio of the higher video frequency currents to the lower video frequency currents is a maximum. The continued rotation of the motor 11, however, drives the lens past this point and the ratio of the higher to the lower video currents passes through the maximum and begins to diminish.

When this happens the ratio arm 27 moves to the right, opening the switch 17—19, whereupon the motor 11 stops. The spring drive 7 causes the shaft 13 to rotate counterclockwise so that the lens 1 is moved back toward the focal point. When this happens the ratio arm 27 again moves to the left, since the increased higher frequency video currents due to the sharpened focus increases the magnetic field across the pole face 29. This closes the switch 17—19 so that the motor again is set into operation to drive the lens to the right and the sequence of operation thereupon repeats.

By suitably adjusting the constants of the spring drives 7 and 39, and the dash-pots 9 and 37, as well as the moment of inertias of the motor 11, and the shaft 13 and 41, and the appurtenances, suitable control over the periodicity of the sequence of operation can be obtained. By suitable choice of constants, the over-all system can be critically damped so that the lens 1 having once come near to the focal point, will thereafter be held substantially at the focal point, while the auxiliary equipment, comprising the motor 11 and the oscillating arms 27 and 23, open and close. This control may advantageously be had by making the spring drive motor 7 relatively weak and making the moment of inertia of the shaft 13 and the masses supported thereon, small. At the same time, the spring drive 39 may be made strong and the effective moment of inertia of the shaft 41 made large. The moment of inertia of the arm 21 can be made small and the dash-pot 25 arranged so that the damping effect is small.

With such a choice of constants, the lens 1 will move rapidly to the focal point when the image focused on the "Iconoscope" is badly out of focus and will move very slowly or substantially be held in one position when the focal point is reached, i. e. when the image on the scanning device is sharply focused.

The initial position of the arm 21 may be suitably adjusted, in a number of ways. First, the individual gain of the amplifiers 55 and 57 may be set independently of one another so that the resultant currents from the rectifiers 59 and 61 will produce predetermined electromagnetic effects at the pole faces 29 and 33, which control the movement of the ratio arm 27. Or, if it is desired, the geometry of the ratio arms 27 and the poles 33 may be suitably modified to give varying responses. Thus, by giving suitable form to the arms and poles, the response can be made to be directly proportional to the deflection of the ratio arm or to the square of the displacement or a logarithmic response can be provided. In fact, substantially any predetermined law of response with regard to the deflection can be provided by the simple expedient of suitably shaping the ratio arm 27 and the pole faces 29 and 33. Further control over the initial position or response can be provided by varying the number of turns 31 and 35 on the magnetic cores. It is, therefore, seen that my invention has great flexibility in providing servo-mechanisms with a wide variety of response-actuating characteristics. While I have shown the use of a motor 11 for driving the shaft 13, it is, of course, understood that any suitable driving means can be substituted for this electric motor.

For example, an electromagnetic solenoid drive could be substituted for the motor in which the solenoid takes the shape of an arc, or a straight solenoidal drive could be used by interposing another rack and pinion for imparting rotary motion to the linear motion of the solenoid to rotary motion for the shaft 13.

From the foregoing it will be immediately recognized that the pole pieces 29 and 33 with their respective windings 31 and 35 and the armature 27 together with the arm 21 constitutes the ratio meter 107 shown in Figs. 1, 2 and 3. Similarly the switch 17—19 with the associated spring 39 and dash-pot 37, the source of electrical energy 15, the motor 11, the dash-pot 9, and spring drive 7, constitute the servo-mechanism 109, while the rack 5 and the pinion 3 constitute the controller 111. It will be further recognized that the lens 1 acting in conjunction with the "Iconoscope" 43 of Fig. 4 is the controlled device 101 in Fig. 1, while the filter 51, the amplifier 55, and the rectifier 59 constitute the selector of the dependent quantity 105 and the filter 53, the amplifier 57 and the rectifier 61 constitute the selector of the independent quantity 103. Thus it is at once apparent that the method of automatic focusing described above is descriptive of a system represented by the block diagram in Fig. 1.

It will be readily appreciated from the foregoing that in order to practice my invention in the form of embodiments shown in Figs. 2 and 3 and discussed above, that for example, in the case of a system illustrated by Fig. 2, the controlled device 113 would be a shaft which would be adapted to simultaneously vary capacities and inductances which constitute the phase correction network.

Such networks, as well known in the art in their simplest forms, consist of a lattice mesh in which two series arms and two cross connected arms are provided; the series arms being the reactances of like sign but of opposite sign to the like reactances of the cross connected arms. The selector of the dependent quantity 117 would be a filter, an amplifier, a suitable phase detection bridge, and a rectifier, while the selector 115 of the independent quantity might be a filter, amplifier and rectifier known in the art. The rectified outputs would then serve to feed the ratio meter 107 which may be of the same form discussed above in connection with Fig. 4. The operation of the device, as explained when initially discussing Fig. 2, would be to vary the constants of the phase correction network so as to give zero output from the phase bridge in order that the ratio of the independent to the dependent quantity shall be equal to zero. The ratio meter would not serve to actuate the controller through the servo-mechanism so that the inductances and capacities forming the variable phase correction network would be changed in such a direction as to maintain zero phase angle.

It will be readily understood that while I have discussed an automatically controlled variable phase correction network in discussing the embodiment of my invention as shown in Fig. 2, I in no way limit this application of my invention to closed-cycle control systems. I have merely chosen this particular application for convenience to illustrate the application of my invention to a field of considerable promise.

In the case of a closed-cycle system covered by the drawing No. 3, it will be readily appreciated from the previous discussion where I have described the use of my system in connection with steering a ship so as to avoid going aground in shoal water, that this system in general may be called a "homing system". Homing control systems per se may be described as those control systems which will automatically maintain an automotive craft whether for use on land, sea, or in the air along a predetermined course. To this end referring again to Fig. 3, the two control elements 119 and 121 would be the stern and bow microphone respectively, while the selectors 123 and 125 would each comprise a filter, amplifier, and rectifier; the rectified outputs of the two selectors 123 and 125 would then feed the ratio meter 107 to actuate the controller 111 through the servo-mechanism 109. The controller in this case would serve to actuate the rudder of the ship in such a fashion as to cause the ship to maintain a course so that the ratio of the stern rectified current to the bow rectified current would be a maximum. It is obvious from this that the control elements 119 and 121 may alternatively be photocells, for example, mounted fore and aft of the ship and the controller 111 operated in a reverse direction so that the ratio of the bow rectified current to the stern rectified current will be a maximum, it being understood in this case that a light source such as a lighthouse ship is used to furnish the illumination for the photocell. It will, likewise, be readily appreciated that this same system in toto may be used for example, upon air craft or automobiles for the same purpose of providing an automatic homing device.

While this invention has been described in complete detail insofar as its application to television is concerned with reference to a type of television transmission system wherein the optical image is focused upon a light responsive or mosaic plane to produce thereon both a potential and a charge image of the subject which results from the release of photoelectrons whenever the light image falls upon the light responsive plane, it is, of course, obvious that the invention applies equally well to other forms of television scanning devices. One example of other forms of television scanning devices is the type wherein the optical image is projected upon a photosensitized plane within a scanning to cause a bundle of electrons to move through the tube toward some suitable high potential surface. In such an arrangement the high potential surface is apertured at some suitable area of elemental size therein and behind the aperture a high potential collecting electrode is located. As the bundle of electrons representing the image is moved by suitable deflecting fields in two transverse directions, this collecting electrode, in effect, scans the complete bundle of electrons to produce in an output circuit coupled thereto a wave train of energy which includes frequency components varying from low to high in accordance with the subject scanned. It is believed it will thus be clear that by making a selection of any two separate bands of energy within the spectrum of frequencies developed by the scanning operation, the optical system may be adjusted in a manner similar to that herein described so as to focus the light image of the subject upon the light responsive plane of this modified type of scanning system without departing from the principle of operation described in connection with television scanning wherein there occurs a storage of electrical energy representative of the light image.

Further, it naturally follows that the invention likewise is applicable to the so-called "Nipkow" disk, mirror wheel, vibrating mirror and other related mechanical types of scanning instrumentalities.

From the foregoing it will be seen that I have provided an improved method and means for practicing closed-cycle control systems which has the advantage over all other systems in that it is not necessary to maintain constant the absolute magnitude of any of the derived quantities from the control element. It will be understood that various modifications within the conception of those skilled in the art are possible without departing from the spirit of my invention or the scope of the appended claims.

What I claim is:

1. The method of operating a closed-cycle system which comprises the steps of developing energy related to a parameter of a controlled element of the system, developing energy related to a second parameter of a controlled element of the system, determining the ratio of the two developed energies, and initiating a controlling action upon the system in accordance with the determined ratio irrespective of the variance of the difference between the parameters forming the developed ratio.

2. The method of operating a closed-cycle system which comprises the steps of developing energy related to a parameter which is substantially independent of the operation of the system, developing energy related to a parameter which is substantially dependent upon the operation of the system, and initiating a controlling action upon the system in accordance with the maximum ratio of either developed energy compared to the other developed energy irrespective of the variance of the difference between the parameters forming the developed ratio.

3. The method of operating a closed-cycle system which comprises the steps of developing energy related to a parameter of the operation which is substantially independent of the operation of the system, developing energy related to a parameter of the operation which is substantially dependent upon the operation of the system, comparing the two developed energies to derive a ratio therefrom, and initiating a controlling action upon the system in accordance with the derived ratio irrespective of the variance of the difference between the parameters forming the developed ratio.

4. The method of maintaining focus in television scanning operation which comprises focusing a light image of a subject upon a light responsive plane to be scanned, developing independent electrical energies in accordance with the relative sharpness of focus of the image of the subject upon the light responsive plane, and comparing the developed independent electrical energies one with the other and varying the focusing of the image of the subject upon the light responsive plane in accordance with the ratio of one of the developed electrical energies to the other.

5. The method of maintaining optimum focus of an image of a subject upon a scanning element which comprises the steps of projecting an optical image upon a light responsive area to produce an electrical image of the subject, scanning the electrical image to produce a wave train of energy representative of each elemental area of the electrical image, selecting from the wave train of the produced energy predetermined energy components comprised within two separated bands of the frequency range represented by the produced wave train of energy, comparing the selected energy components, and varying the focus of the optical image upon the light responsive area in accordance with departures from a fixed pre-established ratio of the selected energy wave trains.

6. In a closed-cycle control system, the combination of controlled and controlling elements, means for deriving energy proportional to a parameter of the controlled element which is substantially independent of the control operation, means to derive energy from a second parameter of the controlled element which is substantially dependent upon the control operation, means for determining the ratio of the two derived energies, and means to actuate the controlling element in accordance with the determined ratio whereby the ratio between the two energies is maintained at a maximum.

7. In a television system, means for focusing a light image of a subject upon a light responsive plane, means for scanning the light responsive plane, means for developing electrical energies in accordance with the light intensity of the elemental areas scanned, means for separating the developed electrical energies into two frequency bands of energy, means for determining the ratio of the two separated bands of energy, and means for varying the focusing means in accordance with the ratio of the two bands of energy.

8. In a television system, means for focusing a light image of a subject upon a light responsive plane, means for scanning the light responsive plane, means for developing electrical energies in accordance with the light intensity of the elemental areas scanned, electrical band-pass filters for separating the developed electrical energies into two groups of energies, means for determining the ratio of the two separated groups of energy, and means for varying the focusing means in accordance with the ratio determined.

9. In a homing system, a source of signalling energy, means for transportation, a first means for receiving said signalling energy upon said means of transportation, a second independent means for receiving said signalling energy on said means of transportation, means for individually detecting the received energies, means for determining the ratio of the two detected energies, and means for controlling the transportation means in accordance with the ratio of the two detected signals irrespective of the variance of the difference between the parameters forming the developed ratio.

10. In a communication system, automatically controlled phase correction network comprising a variable phase correcting network, means for transmitting carrier wave energy of constant frequency and amplitude, means for receiving the constant frequency constant amplitude wave energy, means for detecting the phase shift in the received energy, means for determining the ratio between energy which is proportional to the detected phase shift and the amplitude of the received energy, and means to vary the phase correcting network in accordance with the ratio determined irrespective of the variance of the difference between the parameters forming the developed ratio.

11. A means for operating a closed-cycle control system comprising means for developing energy related to a first parameter of a controlled element of the system, means for developing energy related to a second parameter of a controlled element of the system, means for determining the ratio of the two developed energies, and means for initiating a controlling action upon the system in accordance with the determined ratio irrespective of the variance of the difference between the parameters forming the developed ratio.

ALFRED N. GOLDSMITH.